March 3, 1964     J. A. BEDNAR ETAL     3,123,174
POWER STEERING SYSTEM FOR ARTICULATED VEHICLES
Filed June 6, 1962     2 Sheets-Sheet 1

INVENTORS
Joseph A. Bednar &
BY Raymond T. Warner

Paul J. Reising
ATTORNEY

INVENTORS
Joseph A. Bednar &
BY Raymond T. Warner

Paul J. Leising
ATTORNEY

United States Patent Office 3,123,174
Patented Mar. 3, 1964

3,123,174
POWER STEERING SYSTEM FOR ARTICULATED VEHICLES
Joseph A. Bednar, North Olmsted, and Raymond T. Warner, Novelty, Ohio, assignors to General Motors Corporation, Detroit, Mich., a corporation of Delaware
Filed June 6, 1962, Ser. No. 200,391
7 Claims. (Cl. 180—79.2)

This invention concerns a power steering system employing an accumulator for storing energy for use in energizing fluid motors and particularly relates to a manner for de-energizing the accumulator whenever the engine of the vehicle is disabled.

It is common practice to use a hydraulic system for actuating the steering jacks of an articulated earth moving vehicle of the type having front and rear wheel carrying frames interconnected about a vertical pivot axis. The system commonly comprises a reservoir, a pump drawing from the reservoir to supply an accumulator, and a control valve operated by the vehicle operator for selectively supplying pressurized fluid from the accumulator to the jacks. When this vehicle is no longer in use, the pressure charge often remains in the accumulator, and at times may not be dissipated except to the extent caused by leaks in the hoses and various connections in the system. The fact that the accumulator stores energy after use of the vehicle is discontinued, results in the steering system being fully operable for an appreciable length of time thereafter so as to create a dangerous condition. For example, if an unauthorized person not familiar with vehicles of this type should turn the steering wheel or other means connected to the control valve, the jacks will be actuated with resultant rapid articulation of the vehicle frame sections and could thereby cause injury to such person or onlooker.

In accordance with the present invention the above mentioned problem is alleviated by providing a safety means in the hydraulic system which serves to exhaust the accumulator after a predetermined time lapse after the vehicle engine is shut off. The safety means includes a valve which is interposed in the fluid circuit of the system and is responsive to the pressures in the accumulator and that developed by a second source such as the transmission pressure. In this manner, whenever the engine of the vehicle is not operating, the differential pressure acting on the valve serves to de-energize the accumulator by connecting the latter to the sump or reservoir.

A fuller understanding of the subject invention can be derived from a perusal of the following description taken in conjunction with the drawings in which.

Figure 1:
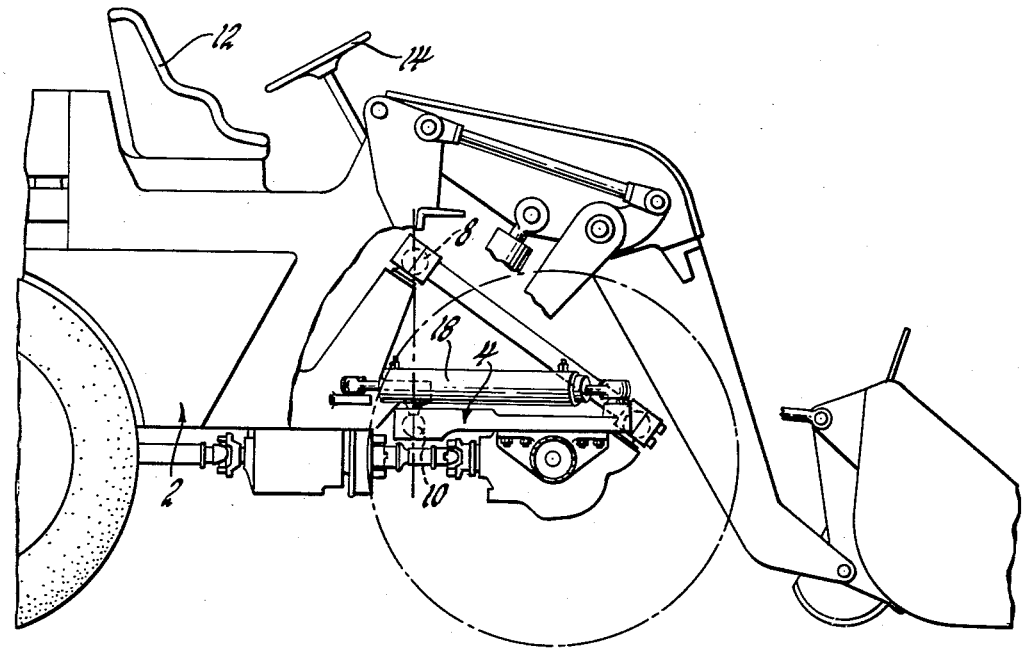
FIGURE 1 is an elevation view with parts broken away of an articulated vehicle incorporating the present invention.
Figure 2:
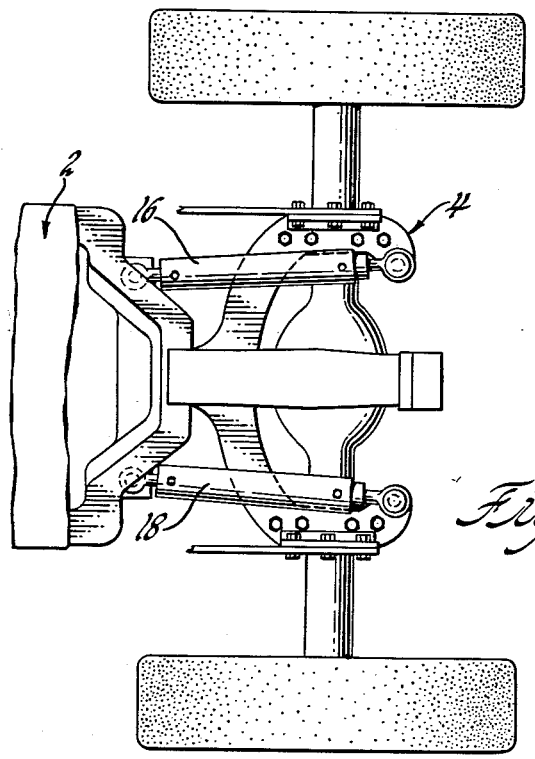
FIGURE 2 is a plane view with parts broken away of the vehicle shown in FIGURE 1.

Referring now to the drawings and particularly FIGURES 1 and 2, a rubber-tired tractor is shown having a main frame 2 and a steerable auxiliary frame 4, both of which are interconnected for articulated movement about a vertical pivot axis passing through the ball and socket connections 8 and 10. An operator's seat 12 is positioned on the frame 2 to the rear of a steering wheel 14 connected at the end thereof to an appropriate control valve (not shown) for selectively directing pressurized fluid to each of the hydraulic steering jacks 16 and 18 connected between the frames 2 and 4. As will become more apparent as the description proceeds, turning of the steering wheel 14 results in corresponding articulated movement of the auxiliary frame 4 about the aforementioned pivot axis.

Figure 3:
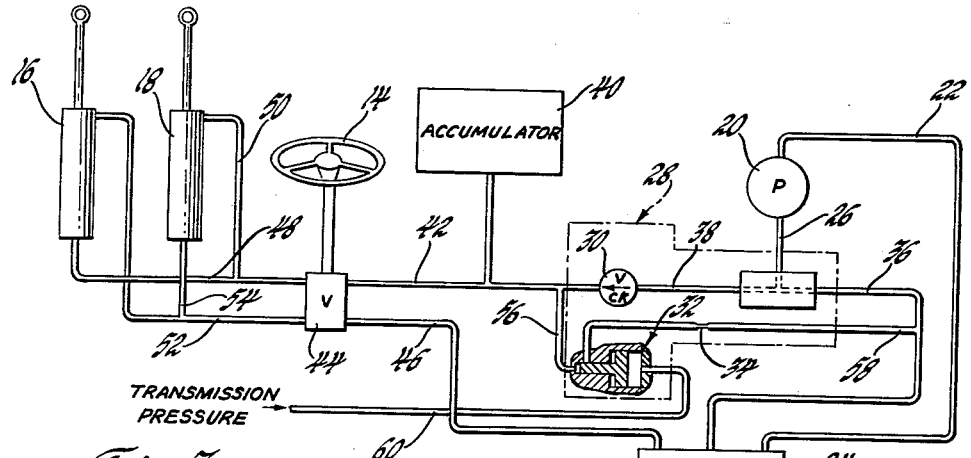
FIGURE 3 is a schematic of a hydraulic circuit incorporating the present invention.
Figure 4:
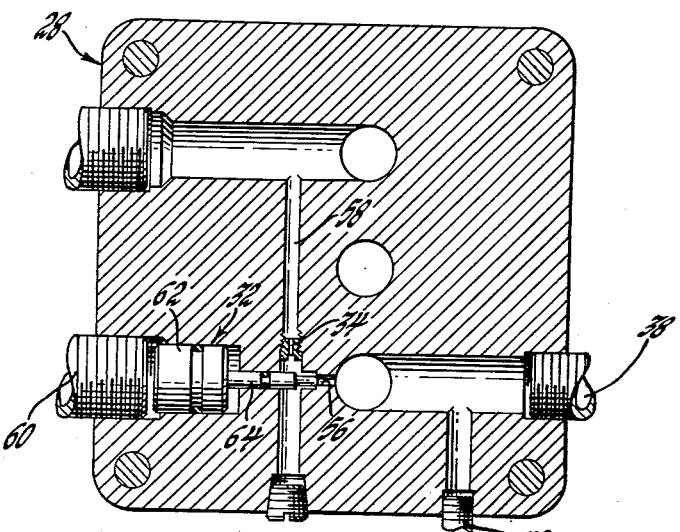
FIGURE 4 is a vertical section of a manifold assembly of a type that can be incorporated with the hydraulic circuit shown in FIGURE 3.

Referring now to FIGURES 3 and 4, the hydraulic circuit for controlling steering jacks 16 and 18 is shown having a pump 20 which is connected through a conduit 22 to a hydraulic sump or reservoir 24. The pump 20 discharges through a conduit 26 to a manifold 28, which includes a spring biased one-way check valve 30, a piston-type unloader valve 32, a restricted orifice 34, and suitable passages interconnecting the elements in a manner which will be explained hereinafter. The pump 20 is driven in accordance with the speed of the vehicle engine and is of the conventional type which includes valving which permits discharge through a conduit 36 to the reservoir 24 when no load exists on the pump and discharge to the manifold conduit 38 when a load is present.

Fluid pressure supplied to the conduit 38 causes the check valve 30 to open and the accumulator 40 to be charged. The accumulator is connected by a conduit 42 to a steering or control valve 44 positioned in response to rotation of the steering wheel 14. The control valve 44 is of a conventional closed-center type having a neutral position preventing any flow therethrough and two other positions respectively controlling pressurization of opposite sides of the steering jacks 16 and 18, while venting the other side thereof to the reservoir through conduit 46. Thus, when moved from the neutral position to one of its two other positions, the steering valve 44 directs fluid under pressure through conduit 48 and branch conduit 50 to opposite ends of the steering jacks while the other ends thereof are vented through the conduit 52 and branch conduit 54, valve 44, and conduit 46 to the reservoir 24. If moved to its other position, the valve 44 supplied pressurized fluid to the other ends of the jacks 16 and 18 through the conduit 52 and branch conduit 54 and vents fluid from the opposite ends of the jacks via the conduit 48, branch conduit 50, valve 44, and conduit 46 to the reservoir 24. When the steering wheel 14 is in neutral or closed-center position, the fluid in the steering jacks is locked therein and is also locked between the steering valve 44 and check valve 30 in the conduit 42.

A conduit 56 connects the unloader valve 32 with the conduit 42 and accumulator 40 and permits the latter to bleed off accumlated pressure through a conduit 58 which leads to the conduit 36 connected to the reservoir 24. The unloader valve is positioned in response to pressure in the vehicle transmission which is transmitted through conduit 60 and is supplied by an engine responive pump (not shown).

FIGURE 4 shows an embodiment of the manifold 28 with the arrangement being such that when the engine is operating, the transmission pressure acts against the head 62 of the unloader valve 32 to exert sufficient force to cause the stem 64 to close conduit 56 and thereby prevent communication between the conduits 56 and 58. However, when the engine is not operating, the transmission pressure in conduit 60 drops to a predetermined value whereupon the accumulator pressure in the conduit 56 acts against the end portion of the stem 64 to unseat the latter from a blocking position with respect to the conduit 56 so as to provide a fluid connection between the conduits 56 and 58. Hence, it can be seen that whenever the vehicle's engine is not operating, the unloader valve opens to immediately bleed off the accumulator and thereby prevent the jacks 16 and 18 from being actuated in the event that the steering wheel 14 is rotated. Of course, it should be apparent that the time required to completely dissipate the accumulator is determined by the size of the orifice 34, and by increasing or decreasing the size of the orifice a corresponding increase or decrease in the bleed-off time is realized.

It should be noted that the head 62 and stem 64 of the unloader valve are respectively formed with relatively large and small areas exposed to the transmission and accumulator pressures. Thus, the transmission pressure, though of a relatively small value compared to the accumulator pressure, is able to maintain the unloader valve in a closed position when the vehicle engine is operating. Also, although not shown in the drawings, means are employed with the valve 32 to limit opening movement thereof when acted upon by the accumulator pressure.

Various changes and alterations can be made in the above-described construction without departing from the spirit of the invention. It should be understood that such changes and alterations are contemplated and we do not intend to be limited except by the scope of the appended claims.

What is claimed is:

1. In a hydraulic system having a first source of pressurized fluid, a fluid motor to be actuated from the first source, an accumulator, a fluid circuit for connecting the first source and accumulator to the fluid motor, a second source of pressurized fluid, a pressure responsive valve interposed in the circuit between the accumulator and the second source, a sump in said circuit selectively connectable with the accumulator by said valve, said valve adapted to maintain the accumulator energized whenever the pressure in the second source is above a predetermined value and to connect the sump with the accumulator so as to de-energize the latter whenever the pressure in the second source falls below a predetermined value.

2. In a hydraulic system having a first source of pressurized fluid, a fluid motor to be actuated from the first source, an accumulator, a fluid circuit for connecting the first source and accumulator to the fluid motor, a second source of pressurized fluid, and a pressure responsive valve having a first and second surface, said valve interposed in the circuit when the first surface subjected to accumulator pressure and the second surface subjected to second source pressure so that the valve will open to exhaust the accumulator whenever the pressure in the second source falls below a predetermined value.

3. The device of claim 2 wherein the area of the first surface is greater than that of the second surface.

4. In a hydraulic system having a first and second source of pressurized fluid, a fluid motor having a piston therein, an accumulator, a fluid circuit for connecting the first source and accumulator to the fluid motor, a check valve located between the accumulator and the first source of pressurized fluid, a sump connected in the circuit with first source, accumulator, and fluid motor, a pressure responsive valve for connecting the accumulator to the sump and located between the first and second source, said pressure responsive valve preventing fluid connection between the accumulator and sump when the pressure in the second source is above a predetermined value.

5. In a hydraulic system having a first and second source of pressurized fluid, a fluid motor having a piston therein, an accumulator, a fluid circuit for connecting the first source and accumulator to the fluid motor, a control valve interposed in said circuit between the accumulator and the fluid motor for selectively directing fluid to either side of the piston, a sump connected in the circuit with the first source, accumulator, and fluid motor, a valve for connecting the accumulator to the sump and located between the first and second source, said valve preventing fluid connection between the accumulator and sump when the pressure in the second source is above a predetermined value.

6. In an articulated vehicle including a prime mover and transmission and having a pair of frame sections movable relative to each other about a vertical pivot point by a fluid motor, a hydraulic system having a pump for generating a first source of pressurized fluid, said fluid motor having a piston therein, an accumulator, a fluid circuit for connecting the pump and accumulator to the fluid motor, a control valve interposed in said circuit between the accumulator and the fluid motor for selectively directing fluid to either side of the piston and having a neutral position, a check valve located between the accumulator and the pump, a second source of pressurized fluid being generated by the transmission, a sump connected in the circuit with the pump, accumulator, and fluid motor, a pressure responsive valve for connecting the accumulator to the sump and located in the circuit between the first and second source of pressurized fluid, said pressure responsive valve having a first and second surface respectively connected to the first and second source so as to prevent fluid connection between the accumulator and sump when the pressure in the second source is above a predetermined value.

7. A hydraulic system for a vehicle including an engine, said hydraulic system comprising a source of pressurized fluid, a fluid motor to be actuated from said source, an accumulator, a fluid circuit for connecting the source and accumulator to the fluid motor, a control valve interposed in said circuit between the accumulator and the fluid motor for selectively directing fluid to the latter, a sump in said circuit, a normally closed unloading valve in the circuit positioned between the accumulator and the sump, and means associated with said unloading valve permitting automatic opening of the latter so that the accumulator is connected to the sump and thereby de-energized whenever said engine is not operating.

References Cited in the file of this patent
UNITED STATES PATENTS
2,896,733   Rockwell _____ July 28, 1959

UNITED STATES PATENT OFFICE
CERTIFICATE OF CORRECTION

Patent No. 3,123,174            March 3, 1964

Joseph A. Bednar et al.

It is hereby certified that error appears in the above numbered patent requiring correction and that the said Letters Patent should read as corrected below.

Column 3, line 37, for "when" read -- with --.

Signed and sealed this 15th day of September 1964.

(SEAL)
Attest:

ERNEST W. SWIDER            EDWARD J. BRENNER
Attesting Officer            Commissioner of Patents